US006696684B2

(12) United States Patent
Radtke et al.

(10) Patent No.: US 6,696,684 B2
(45) Date of Patent: Feb. 24, 2004

(54) FORMATION EVALUATION THROUGH AZIMUTHAL TOOL-PATH IDENTIFICATION

(75) Inventors: Richard J. Radtke, Pearland, TX (US); Robert A. Adolph, Houston, TX (US); Hélène C. Climent, Sugar Land, TX (US); Luca Ortenzi, Stafford, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 10/034,476

(22) Filed: Dec. 28, 2001

(65) Prior Publication Data

US 2003/0122067 A1 Jul. 3, 2003

(51) Int. Cl.[7] .................................................. G01V 5/04
(52) U.S. Cl. ..................................... 250/269.3; 250/262
(58) Field of Search ............................ 250/269.3, 262; 73/152.02, 152.54; 324/333

(56) References Cited

U.S. PATENT DOCUMENTS

| | | | |
|---|---|---|---|
| 4,618,765 A | * 10/1986 | Sonne | 250/269.3 |
| 4,894,923 A | 1/1990 | Cobern et al. | |
| 5,019,708 A | * 5/1991 | Flaum | 250/264 |
| 5,064,006 A | 11/1991 | Waters et al. | |
| 5,091,644 A | 2/1992 | Minette | |
| 5,397,893 A | 3/1995 | Minette | |
| 5,467,832 A | 11/1995 | Orban et al. | |
| 5,473,158 A | 12/1995 | Holenka et al. | |
| 6,215,120 B1 | 4/2001 | Gadeken et al. | |
| 6,307,199 B1 | 10/2001 | Edwards et al. | |

OTHER PUBLICATIONS

Search Report under Section 17 dated Jul. 28, 2003 for Great Britain Application No. 0228012.1

* cited by examiner

Primary Examiner—Diego Gutierrez
Assistant Examiner—Tania Courson
(74) Attorney, Agent, or Firm—Victor H. Segura; Brigitte L. Jeffery; John J. Ryberg (57) ABSTRACT

A method for tool path identification in formation evaluation includes obtaining measurements of formation properties in azimuthal sectors for each of a plurality of depth levels; calculating quality factors from the measurements; identifying a centroid or maximum of the quality factors among the measurements in each of the azimuthal sectors for each depth level; and associating the centroid or maximum of the quality factors at each depth level along a borehole to form the tool path. Calculating the quality factors may include parameterizing the measurements according to at least one factor selected from a spine factor, a rib factor, and a volumetric photoelectric factor. A method for determining corrected measurements for formation properties includes identifying a tool path from measurements taken in azimuthal sectors at each depth level along a borehole; and calculating a corrected measurement at the each depth level by averaging measurements in the azimuthal sectors adjacent the tool path.

47 Claims, 3 Drawing Sheets

FORMATION EVALUATION THROUGH AZIMUTHAL TOOL-PATH IDENTIFICATION

BACKGROUND OF INVENTION

1. Field of the Invention

The present invention is related to the field of data processing methods for oil well logging. More specifically, the present invention relates to methods for improved formation data evaluation by azimuthal tool path identification.

2. Background Art

The petroleum industry uses various tools to obtain measurements for estimating earth formation properties. Typical measurements include density, porosity, and conductivity. These measurements are often used in combination to derive the formation properties. For example, the formation density is often combined with other measurements (e.g., neutron porosity measurements and resistivity measurements) to determine gas saturation, lithology, porosity, the density of hydrocarbons within the formation pore space, properties of shaly sands, and other parameters of interest.

Most of these measurements can be performed either after a borehole has been drilled or simultaneously with the drilling of the borehole, i.e., logging-while-drilling (LWD) or measurement-while-drilling (MWD). Regardless of how these measurements are performed, they are generally sensitive to environmental effects such as the position of the logging tool in the borehole and the physical properties of the drilling fluid. For example, in neutron porosity measurements, the size of the borehole, the amount of stand-off of the tool from the borehole, the hydrogen index and salinity of the drilling fluid, and the salinity of the formation fluids, to name just a few, all affect the accuracy of the measurements. Similarly, in gamma-gamma density measurements, which have relatively shallow depths of investigation but are strongly focused, stand-off and drilling mud could have significant impact on the accuracy of the density measurements. Therefore, accurate formation evaluation depends on minimizing these environmental effects and/or correcting for them.

These environmental effects and their corrections can be best illustrated in gamma-gamma density logging. J. S. Wahl, J. Tittman, and C. W. Johnstone introduced a method of density measurement using an isotopic gamma ray source (e.g., $^{137}Cs$) and two gamma ray detectors (scintillation counters), in *"The Dual Spacing Formation Density Log"*, Journal of Petroleum Technology, December 1964. The basic concepts disclosed by Wahl et al. are still in use today. The density logs thus obtained are often referred to as dual spaced density logs or gamma-gamma density logs. The dual spacing formation density log is obtained using a tool having a gamma radiation source (e.g., $^{137}Cs$) and two detectors (scintillation counters), one at a shorter distance and the other at a longer distance from the gamma radiation source. The apparatus is configured as a logging tool (sonde) for "logging" formation density as a function of depth along a borehole. The source and two detectors are typically mounted in an articulating pad device with a backup arm. The backup arm applies force to the articulating pad to maximize pad contact with the wall of the borehole. Special protective shields are installed so that the detectors do not detect gamma radiation directly from the source. Instead, the detectors measure radiation that has been scattered by the formation into the detectors. The scatter reaction is primarily Compton scattering, and the number of Compton scattering collisions within the formation is related to electron density of materials within the formation. Through calibration, a measure of electron density of the formation can be related to true bulk density of the formation.

As stated earlier, the gamma-gamma density measurements, which may be output as bulk density, compensated bulk density, correction factor ($\Delta\rho$), or photoelectric absorption cross section ($P_e$), are adversely affected by tool stand-off and mud existing between the tool and the borehole wall. By using two detectors, a short space (SS) detector and a long space (LS) detector, Wahl et al. were able to correct for these effects from raw density measurements. This correction is based on the phenomenon that the shorter the spacing, the shallower the depth of investigation and the larger the effect of the mudcake. Thus, a short spaced detector, which is very sensitive to the mudcake, can be used to correct a long-spaced detector, which is less sensitive to it. The measurements from the short-spaced and long-spaced detectors are often analyzed with spine-and-ribs plots, which are plots of long-spacing versus short-spacing count rates.

The spine-and-ribs plot takes its name from the appearance of a spine, which is the locus of points with no mudcake, and ribs, which show the effect of mudcake at certain fixed formation densities. In principle, three major factors influence the count rates: formation densities, mudcake densities, and mudcake thicknesses. The spine-and-ribs plot illustrates graphically that for a given formation density there is only one rib for all normal mudcake densities and thicknesses. Thus, although there are three unknowns, it is possible to make a correction using two measurements.

While the spine-and-ribs plot can afford approximate corrections for the mudcake effects, corrections become problematic in an LWD/MWD environment in cases where the rotating tool is slick, under-gauge, or nominally in-gauge but passing through a wash-out. In these instances, stand-off and hence the amount of drilling fluid between the detectors in the tool and the formation depends on the tool's orientation in the borehole, and this varies as the tool rotates. Historically, measurements have been averaged over this azimuthal direction and corrections for the tool/borehole environment applied explicitly and uniformly. This is still the case in traditional neutron porosity processing. This procedure combines measurements taken in different physical configurations (along the azimuthal direction) with only a rough correction for the environment; hence, it can give inaccurate results.

With the advent of the ability to make azimuthal measurements (i.e., measurements in azimuthal sectors at a depth level) while drilling, the situation has improved but is not yet ideal.

Gamma-gamma density measurements can now be acquired in azimuthal sectors. These azimuthal density tools (e.g., azimuthal density neutron tools produced by Schlumberger under the trade name of ADN™) can provide measurements that are borehole compensated for improved accuracy, standoff, and photoelectric factor measurements while drilling. Stand-off and mud weight corrections are applied implicitly to measurements from these azimuthal density tools on a sector-by-sector basis with a spine-and-ribs approach. This technique improves accuracy. However, most such tools provide appropriate corrections only out to approximately 0.5 inch of stand-off. For a slick 8.25 in. tool in a 12.25 in. borehole, up to 4.0 in. of stand-off occurs routinely. Consequently, many sectors of measured density are inaccurate.

The azimuthal tools produce arrays of formation density measurements at each depth or time level, some of which are more accurate than others. However, it is often desirable that a single density, which characterizes the formation, is available at a given depth or time level. To satisfy this need, one approach is to assume that the tool's most accurate measurements are obtained when the detectors are oriented toward the bottom of the borehole. In a deviated borehole under ideal conditions, the bottom sector has a minimal distance between the detectors and the borehole wall. Under this assumption, measurements from the sectors in the bottom quadrant are combined to provide a single formation density. This technique can be used in azimuthal tools (such as the ADN™ tools) and offers a substantial improvement over the averaging technique.

However, rotation during drilling and changes in borehole trajectory can cause the most accurate orientation to shift from the bottom of the hole. The same situation can occur around sharp dog-legs or if the borehole becomes rugose or elliptical in cross section. Clearly, formation measurements in slick or under-gauge situations would be improved if the orientation of the rotating tool providing the most accurate measurement were known and the data from the sectors surrounding this orientation were used to derive the final result.

Much effort has been directed at obtaining improved formation evaluation, particularly density, based on selecting those sectors with more accurate measurements. None of these efforts completely addresses the problem, however.

U.S. Pat. No. 5,091,644 issued to Minette discloses a method for minimizing error in formation data in a MWD logging tool by comparing the relative error of measured spectra from different azimuthal sectors and combining those spectra in a way that minimizes the error. The relative error may be a combination of rib error and statistical error. The sectors may be defined by an accelerometer and/or a magnetometer with respect to time or by a caliper with respect to stand-off. Four difficulties exist with this approach. First, in situations with large stand-off or large washouts, the measured density has a small relative error but is characteristic of the drilling fluid, not the formation. Thus, relative error is not the same as measurement quality. Second, the relative error considered involves mainly stand-off and statistical uncertainty but neglects the equally important mud weight effects. Third, dipping beds pose a problem for this approach, because relative error can give misleading formation densities in these cases. Fourth, the stand-off measurements typically required with this technique may be unreliable in large holes or heavy muds.

U.S. Pat. No. 5,397,893 issued to Minette discloses a method for minimizing error in formation data in a MWD logging tool based on binning the signals received by the tool based on measured stand-off values. This approach has similar difficulties.

U.S. Pat. No. 6,307,199 B1 issued to Edwards et al. discloses methods for compensation of geometric effects in logging-while-drilling density measurements. These methods are for determining a one-dimensional density, corrected for stand-off and dipping beds penetrated by a borehole, through an analysis of a two-dimensional image from combined depth and azimuthal measurements of density. This technique relies on measurements from several depth levels and is therefore best used in recorded mode, not in real time.

U.S. Pat. No. 5,473,158 issued to Holenka et al. discloses a method for correction that can be used in logging while drilling and apparatus for measuring formation characteristics as a function of angular position within a borehole.

SUMMARY OF INVENTION

One aspect of the invention relates to methods for tool path identification. Methods for tool path identification according to embodiments of the invention include obtaining measurements of formation properties in azimuthal sectors for each of a plurality of depth levels; calculating quality factors from the measurements; identifying a maximum of the quality factors among the azimuthal sectors at each depth level; and associating the maximum of the quality factors at each depth level along a borehole to form the tool path. The calculating the quality factors may include parameterizing the measurements according to at least one factor selected from a spine factor, a rib factor, and a volumetric photoelectric factor.

Another aspect of the invention relates to methods for determining formation properties through tool path identification. Methods according to embodiments of the invention include identifying a tool path from measurements taken in azimuthal sectors at each depth level along a borehole; and computing corrected measurements at each depth level by averaging measurements in a selected number of azimuthal sectors adjacent the tool path.

Another aspect of the invention relates to methods of well logging. Methods according to embodiments of the invention include moving a well logging tool along a borehole and rotating the tool; making measurements in azimuthal sectors at each depth level; determining a tool path from the measurements in the azimuthal sectors; and computing corrected measurements at each depth level by averaging the measurements in a selected number of azimuthal sectors adjacent the tool path.

Other aspects of the invention would become apparent from the following description, the drawings, and the claims.

DETAILED DESCRIPTION

The present invention relates to general techniques that identify the azimuthal sectors at which formation measurement quality is highest. This information is used to construct a "tool path" as a function of depth or time, corresponding roughly to the center of the high-quality region. Measurements in the vicinity of the tool path are then combined to yield a more accurate and precise formation measurement. Many of the geometric problems mentioned above are reduced and formation evaluation is improved with this tool-path-based technique.

Figure 4:
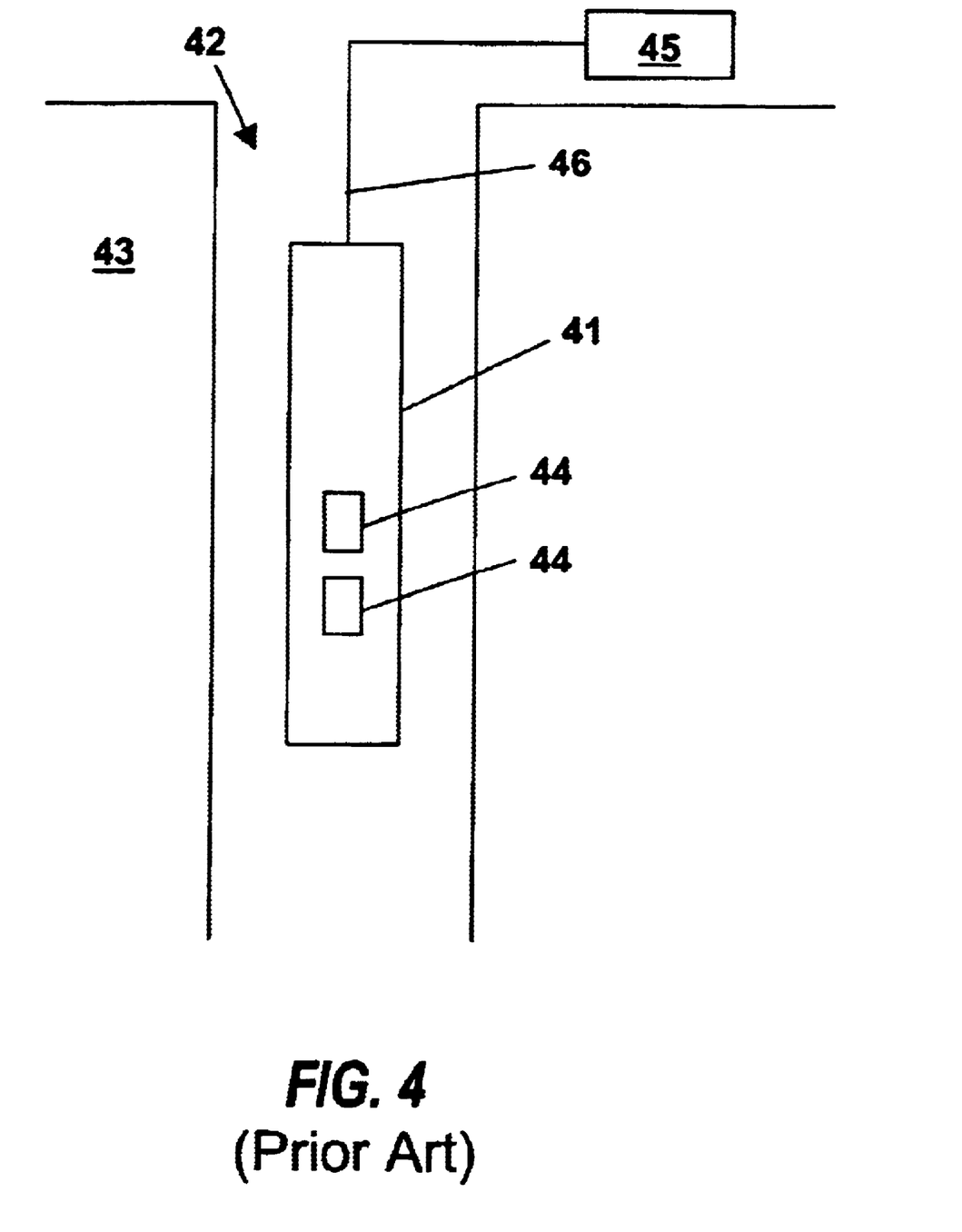
FIG. 4 shows a Prior art logging tool disposed in a borehole.

FIG. 4 shows a prior art well logging tool (a tool) 41 disposed in a borehole 42 penetrating art earth formation 43. The loggins tool 41 may be an LWD or MWD tool having one or more detector 44 and connected via a drill string 46 to a processor 45. which may be tide memories for data storage and programs for data analysis. One of ordinary skill in the art would appreciate that embodiments of the invention arc generally applicable and may use any conventional logging tool or system. A measurement obtained with an LWD or MWD tool (shown as 41) may be based on one or more detectors (shown as 44). Data from which this measurement is derived are recorded as a function of time and as a function of the azimuthal orientation of the detector in the borehole relative to some reference vector. These time-based data may be converted into depth-based data at seine point after they are recorded Therefore, "time level" and "depth level" will be used interchangeably herein, whether the initial measurements are recorded in time domain or depth domain. These data are analyzed according to the following procedure.

First, a quality factor is computed. Data at each time or depth level and each azimuthal sector are used to compute a quality factor which quantifies the level of accuracy of the measurement at that point. That is, larger quality factors correspond to more accurate measurement. While the embodiments of the invention will be discussed using quality factors that represent more accurate measurements, those skilled in the art would appreciate that a different criterion that represents degree of inaccuracy in the measurements may be used without departing from the scope of the invention.

Next, a tool path is identified according to the computed quality factors. At each depth or time level, the computed quality factor is used to identify a tool path, which is generally, but not always, the centroid of the azimuthal region of high quality factors. One exception to this case can be depth or time level where the quality factors have two or more maxima as a function of azimuth. In these cases, the tool path can be identified with the centroid of one of these maxima. One criterion for selection of one maximum over another is highest overall accuracy of the measurement. Other possibilities are taking the first maximum in the direction of the rotation of the tool with respect to the hole bottom or imposing some kind of continuity or reduced curvature constraint on the tool path. Note that a means to distinguish genuine maxima from false maxima induced by statistical error of the measurements propagated into the quality factor should preferably also be provided.

Finally, a tool-path-based measurement is derived. The measurements from azimuthal sectors adjacent the tool path are combined, in some embodiments through a weighted average, to obtain the final measurement.

Embodiments of the present invention use data from the azimuthal sectors taking the most accurate measurements to define the final measurement regardless of where these sectors occur in the borehole (top, left, right, bottom, etc.), yielding improved accuracy. All environmental effects influencing the measurement can be included in the quality factor. It would become evident from the following discussion that not all environmental effects need to be explicitly realized and included. The quality factor approach according to embodiments of the present invention can implicitly include even those environmental effects that are not realized/appreciated. The tool-path-based measurement as disclosed in the present invention may be available downhole in real time because the data that are processed are of local nature. The quality factor and tool path may also be used as quality control for the tool-path-based measurement.

Embodiments of the present invention can be better understood with the following examples, using gamma-gamma density measurements. Density measurements can be obtained using a tool such as the ADN™ instruments produced by Schlumberger. While the discussion uses gamma-gamma density measurements as examples, those skilled in the art will appreciate that embodiments of the invention are equally applicable to other types of measurement data, e.g., neutron porosity measurements.

As with most other gamma-gamma density measurements, ADN™ tools have two cylindrical NaI crystals coaxial to each other and to a $^{137}$CS source of gamma rays. One NaI crystal is located closer to the source (the short-spaced or SS detector) than the other (the long-spaced or LS detector). Both NaI crystals and the source are shielded and collimated so that the detectors would not measure the gamma rays directly from the source. Instead, the detectors only measure gamma rays that have emerged from the source, entered the formation, interacted with the formation, and scattered back into the crystals. Some of this radiation is detected. The detected radiation is used, through a spine-and-ribs algorithm, to compute an apparent SS electronic density, a LS electronic density, a fully compensated formation density, and a volumetric photoelectric factor, at each depth or time level and each azimuthal sector. These quantities are the elements on which embodiments of the present invention operate.

In general, the quality factor is a local function; it depends on the quantities measured by the logging tool in the azimuthal sectors at a given depth/time level. For the embodiments considered here, the quality factor for a given depth/time level and azimuthal sector is defined as a function of the apparent SS electronic density, the LS electronic density, and the volumetric photoelectric factor U computed at that depth/time level and sector. In one embodiment, the quality factor is inspired by the spine-and-ribs approach, in which high-quality points lie near the spine. The quality factor may be averaged over depth or time levels to reduce statistical noise.

In the embodiments of the present invention, the quality factor may be parameterized as a product of a spine, a rib, and a U factor. The spine and rib factors may be parameterized according to the apparent densities along ($\rho_{i\alpha}^{\parallel}$) and normal to ($\rho_{i\alpha}^{\perp}$) the spine, respectively. For depth level i and azimuthal sector $\alpha=0, 1, 2, \ldots, n$, these densities are defined as $$\rho_{i\alpha}^{\parallel}=(\rho_{i\alpha}^{LS}+\rho_{i\alpha}^{SS})/2 \qquad (1)$$

and $$\rho_{i\alpha}^{\perp}=\rho_{i\alpha}^{LS}-\rho_{i\alpha}^{SS}, \qquad (2)$$

respectively. Embodiments of the invention may apply to any plurality of the azimuthal sectors; however, the number of the azimuthal sectors, n, is preferably between 4 and 32, and more preferably 16. In Equation (2), $\rho_{i\alpha}^{LS}$ and $\rho_{i\alpha}^{SS}$ are the long- and short-spacing electronic densities obtained from the corresponding bulk LS densities (RLSC) and bulk SS densities (RSSC) by $$\rho_{i\alpha}^{LS}=(RLSC+0.1883)/1.0704 \qquad (3)$$

and $$\rho_{i\alpha}^{SS}=(RSSC+0.1883)/1.0704. \qquad (4)$$

Note that the constants (0.1883 and 1.0704) in equations (3) and (4) are empirically determined, in this case for a particular ADN™ tool. Those skilled in the art will appreciate that these numbers will vary and should be determined for the particular instrument used. In addition to the spine and rib factors, the apparent volumetric photoelectric factor for the same depth level and azimuthal sector, $U_{i\alpha}$, which had been stored in volumetric photoelectric factor (USC), is used to indicate when the measured density is contaminated by the mud.

Figure 1:
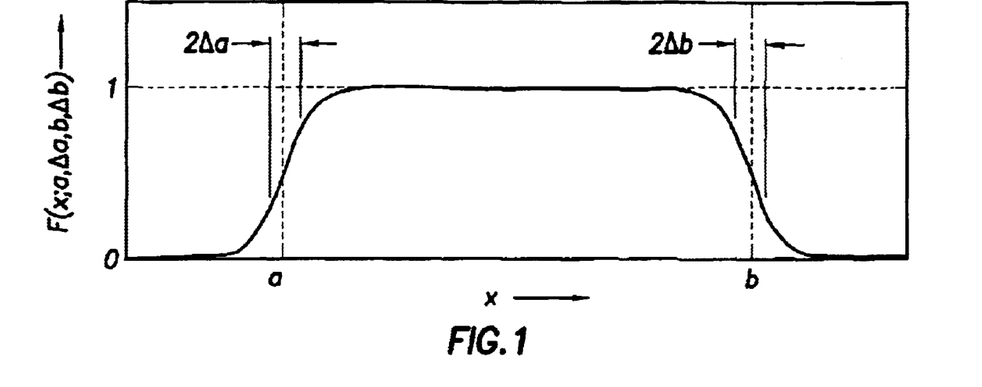
FIG. 1 is a plot of a function that has a plateau within a selected range of the variable.

According to one embodiment of the invention, the quality factor $Q_{i\alpha}$ at depth level i and azimuthal sector $\alpha$ may be defined as a product of the spine, the rib, and the U factors:

$$Q_{i\alpha}=F(\rho_{i\alpha}{}^{\parallel};\alpha_S,\Delta\alpha_S,b_S,\Delta b_S) \times F(\rho_{i\alpha}{}^{\perp}; \alpha_R,\Delta\alpha_R,b_R,\Delta b_R) \times F(U_{i\alpha};\alpha_U, \Delta\alpha_U,b_U,\Delta b_U), \quad (5)$$

where the function F has a general formulation of $F(x; \alpha, \Delta\alpha, b, \Delta b)$, in which x represents a spine, rib, or U variable $\rho_{i\alpha}{}^{\parallel}$, $\rho_{i\alpha}{}^{\perp}$, or $U_{i\alpha}$), a represents the lower limit, b represents the upper limit, and $\Delta\alpha$ and $\Delta b$ represent the window of change at the lower and upper limits, respectively. This general formulation represents a function that has a plateau and decreases at the lower and upper limits with a window of change of $\Delta\alpha$ and $\Delta b$, respectively, as illustrated in FIG. 1. This general formulation is justified in situations where a parameter is expected to have a value in a certain range, and values outside this expected range are considered to be erroneous.

Figure 2A:
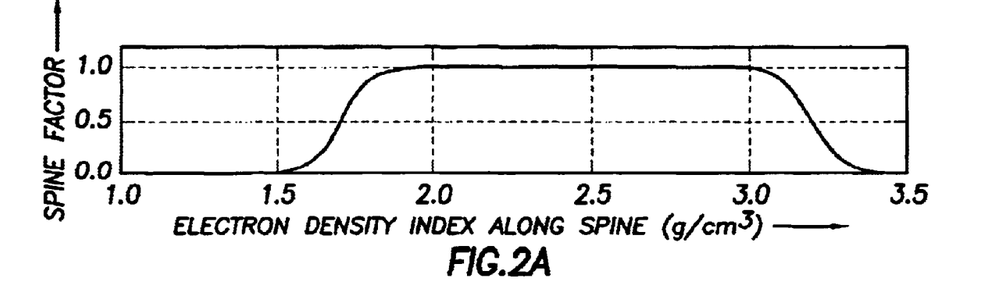
FIGS. 2A–2C illustrate exemplary plots of quality factors as functions of the spine, the rib, and the U factors, respectively.

The density measurements parallel to the spine $\rho_{i\alpha}{}^{\parallel}$ as defined in equation (1) should represent the formation densities, i.e., $F(\rho_{i\alpha}{}^{\parallel};\alpha_S,\Delta\alpha_S,b_S,\Delta b_S)$ associates high-quality measurements with densities in the range of formation densities. This function excludes low densities, which are more characteristic of the drilling fluid, and high densities, which are unlikely to correspond to earth formation properties. FIG. 2A shows a plot of the spine factor as a function of electron density index (g/cm³) along the spine. This function is plotted with the following parameters: $\alpha_S=1.7$ g/cm³, $\Delta\alpha_S=0.05$ g/cm³, $b_S=3.2$ g/cm³, and $\Delta b_S=0.05$ g/cm³. Those skilled in the art would appreciate that these parameters, which depend on the tool used and the properties of the formation being evaluated, should be empirically determined.

Figure 2B:
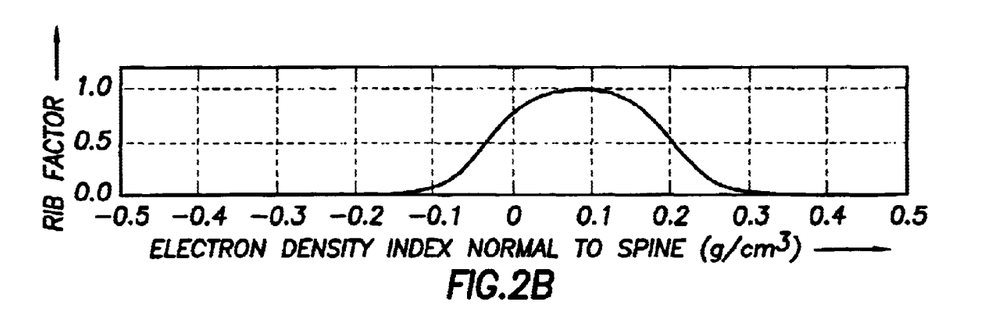

The $\rho_{i\alpha}{}^{\perp}$ parameter (in the rib factor) as defined in equation (2) is expected to have a value in a defined range that is tool dependent. The rib factor connects high-quality measurements with small difference between long- and short-spaced electron densities. In the spine-and-ribs algorithm, this quantity is related to the correction to the LS density from which the final compensated density is computed. In other words, $\rho_{i\alpha}{}^{\perp}$ is related to the correction applied to the long-spacing bulk density to yield the compensated bulk density. Therefore, a small $|\rho_{i\alpha}{}^{\perp}|$ corresponds to situations which have generally low stand-off and correctable mudcake effects. Thus, situations with generally low stand-off and correctable mudcake effects are selected. This parameter, $\rho_{i\alpha}{}^{\perp}$, may be described as a rib factor, $F(\rho_{i\alpha}{}^{\perp}; \alpha_R, \Delta\alpha_R, b_R, \Delta b_R)$, which connects high-quality measurements with small $|\rho_{i\alpha}{}^{\perp}|$. FIG. 2B shows a plot of the rib factor as a function of electron density (g/cm³) normal to the spine. The reference condition of a particular ADN™ tool known as the VISION 825 ADN™ has 0.25 in. of stand-off. Using this tool as an example, the rib factor may be slightly biased toward positive $\rho_{i\alpha}{}^{\perp}$. FIG. 2B illustrates a plot of the function of the rib factor for this tool using the following parameters: $\alpha_R=-0.03$ g/cm³, $\Delta\alpha_R=0.03$ g/cm³, $b_R=0.20$ g/cm³, and $\Delta b_R=0.03$ g/cm³. Those skilled in the art would appreciate that these parameters ($\alpha_R$, $\Delta\alpha_R$, $b_R$, and $\Delta b_R$), which are functions of the tool used, should be empirically determined for the particular tools used.

Figure 2C:
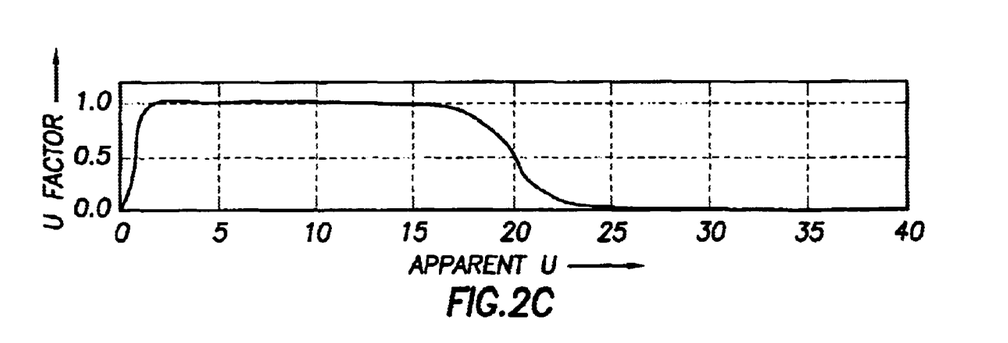

Similarly, the U factor indicates high quality only when the measured volumetric photoelectric factor falls within values expected for earth formations. Higher or lower values suggest that the measurement is contaminated by mud effects and is therefore of lower quality. Thus, the U factor can be generally defined as function $F(U_{i\alpha}; \alpha_U, \Delta\alpha_U, b_U, \Delta b_U)$. FIG. 2C illustrates a representative plot of this function suitable for the VISION 825 ADN™ tool. Parameters as shown in FIG. 2C are as follows: $\alpha_U=0.8$, $\Delta\alpha_U=0.2$, $b_U=20$, and $\Delta b_U=1$. Those skilled in the art would appreciate that these parameters are tool dependent and should be determined for the particular tools used.

The quality factor function as defined in equation (5) takes into account the spine, rib, and U factors from density measurements. To reduce statistical noise, the quality factor for each azimuthal sector may be averaged over a selected number (preferably, between 2 and 5; more preferably, 3) of depth intervals at corresponding azimuthal orientations:

$$\bar{Q}_{i\alpha} = \frac{1}{3}\sum_{j=i-1}^{i+1} Q_{i\alpha}. \quad (6)$$

Similar averaging could also be performed on the measurements of formation properties, instead of the quality factors, to reduce the statistical noise. Alternatively, the averaging may also be performed among a selected number of azimuthal sectors at the same depth level.

Once quality factors in azimuthal sectors are calculated, a tool path is identified according to the computed quality factors. At each depth or time level, the tool path is typically, but not always, the centroid of the region of high quality factor. One exception to this case can be the depth or time level where the quality factor has two or more maxima as a function of azimuth. In these cases, the tool path can be identified with the centroid of one of these maxima. One criterion for selection of one maximum over another is highest overall accuracy of the measurement. Other possibilities are taking the first maximum in the direction of the rotation of the tool with respect to the hole bottom or imposing some kind of continuity or reduced curvature constraint on the tool path. Note that a means to distinguish genuine maxima from false maxima induced by statistical error of the measurements propagated into the quality factor may also be provided.

One method for finding the tool path follows from the intuitive idea that the tool path at a given depth or time level is the centroid of the high-quality factor region at that level. To make this idea quantitative and to reduce the effect of statistical noise, a continuous function of the azimuthal angle can be constructed from the discrete quality factor. In this approach, the location of tool path at each depth or time interval is treated as a continuous, not a discrete, variable as a function of azimuthal sectors. While this function does not reproduce the discrete quality factor exactly, its maximum is a reasonable estimate of the "center" of the high-quality region. The continuous function can be obtained from a low-order Fourier expansion, or any other suitable function, so that the effects of statistical noise (i.e., high-frequency components in the Fourier transform) are reduced. In addition, quality-control parameters may be generated which relate to this function. The quality-control parameters may be used to identify and treat special cases, such as elliptical boreholes or ambiguous situations. For example, with an elliptical borehole, the logging tool may contact the borehole at two points at each depth or time level; hence, there might be two maxima for the quality factors. In this case, a quality-control parameter may be used to help decide whether fitting a single maximum or two maxima is more reasonable. Any quality-control approach known in the art, for example, a least square error or mean square error method, may be used.

Other methods of identifying the tool path include simply finding the sector at which the quality factor is maximal at a given depth or time level, or taking the first sector in the direction of the rotation of the tool with respect to the tool bottom whose quality factor exceeds some minimum value. Additional rules may be easily derived by those skilled in the art, having the benefit of this disclosure. These various methods of identifying the tool path among the azimuthal sectors—e.g., finding the centroid of a continuous function of the quality factors, finding the maximum of the quality factors, and the like—will be generally referred to as identifying the centroid of the quality factors. In other words, "identifying the centroid" shall be interpreted to include identifying the centroid, identifying the maximum, and any variation thereof. Similarly, the "centroid" of the quality factors shall be interpreted to include the "maximum" of the quality factors or the "centroid" of a quality factor function.

The process of using the azimuthal sectors to find a centroid or maximum of the quality factors at a depth level may use all the sectors with measurements or only a selected number of sectors with representative measurements. Similarly, the tool path identification may involve all depth levels or only selected (representative) depth levels (for example, every other levels or every third levels). In other words, the above described processes may be performed with a plurality of azimuthal sectors, instead of every azimuthal sector, and a plurality of depth levels, instead of every depth level.

Once the tool path at each depth or time level is computed, the path angle is converted into a path sector. While the simplest approach is to use the sector as defined in the original logging operation, an alternative is to calculate the path sector according to the following equation:

$$\alpha_i^{path} = (n/2\pi)\theta_i^{path}. \tag{7}$$

where $\alpha_i^{path}$ is the path sector at level i, $\theta_i^{path}$ is the path angle at level i as identified from the quality factors, and n is the number of azimuthal sectors per depth or time level. According to this equation, $\alpha_i^{path}$ is a continuous variable with $0 \leq \alpha_i^{path} < n$. Once the path sector at each level is computed, the overall tool path in the borehole is described by joining these path sectors along the axis of the borehole. The overall tool path may be a path described by simply joining these discrete path sectors. Alternatively, the resultant joined-sector path may be further smoothed by any function known in the art.

Finally, in this embodiment, a tool-path-based measurement is derived from n-sector (in this example, 16-sector) azimuthal measurements. At each depth or time level, the density is computed from the fully compensated formation density data by averaging those data over an azimuthal interval of a pre-selected width (i.e., a width of a selected number of azimuthal sectors, preferably from two to five sectors, and more preferably 3 sectors) centered on the tool path. As stated earlier, the tool path $\alpha_i^{path}$ at a given depth/time level could be an integer-numbered azimuthal sector or a fractional numbered azimuthal sector as defined in Equation (7). If the tool path is an integer-numbered sector, then the averaging could be performed by averaging the i−1, i, and i+1th sectors, if the averaging is to be performed with 3 sectors. With a non-integer sector tool path, the averaging would cover 1.5 sectors wide on either side of the tool path. This average may be a straight average or a weighted average. In particular, the quality factor itself may be used as the weighting factor. In addition, the average of the quality factor over the sectors used in the density computation may be used as an overall quality indicator of the tool-path-based density.

Figure 3A:
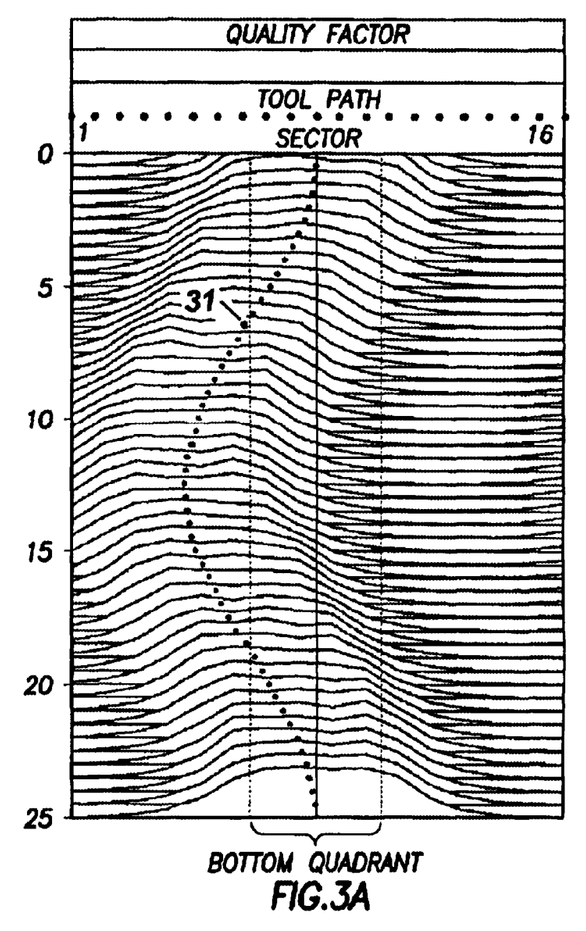
FIGS. 3A and 3B are diagrams illustrating an example of density determination according to one embodiment of the invention as compared with that of bottom quadrant determination.
Figure 3B:
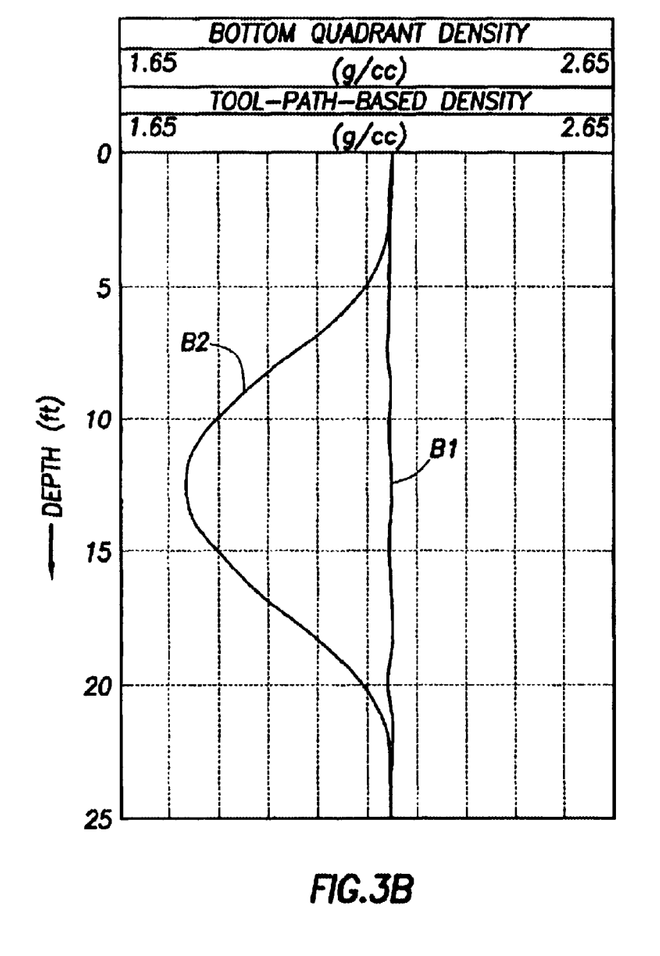

FIG. 3 illustrates a hypothetical example showing that embodiments of the present invention produce a more accurate determination of formation densities than does the prior art bottom quadrant method. In this example, the formation is presumed to have a uniform density of 2.2 g/cm$^3$ and the density measurements were logged in 16 azimuthal sectors per- depth level. In FIG. 3A, the quality factor at each sector and depth level are first calculated; these quality factors are then displayed as stacked plot over the depth range shown (depth range 0–25 feet). It is apparent from this example that the centroid of the quality reactor functions shifts to the lower sector numbers in the middle of this depth range. A tool path 31 as shown in the dotted path is constructed from the centroid of the maximum of the quality factors at each depth level.

This computed tool path is then used to determine the density at each level by averaging the density measurements in the azimuthal sectors adjacent the computed tool path. As shown in FIG. 3B, the computed densities (curve B1) closely match the hypothetical 2.2 g/cm$^3$, while the corresponding density measurements as determined by the bottom quadrant method (curve B2) are significantly lower than the correct values in the middle range of the depth, where the tool path deviates from the bottom quadrant.

While this invention has been demonstrated using limited examples of gamma-gamma density measurements, those skilled in the art, having benefit of this disclosure, will appreciate that other methods can be devised without departing from the scope of the invention as disclosed herein. For example, the invention is equally applicable to other measurements, such as neutron porosity or other azimuthal measurements (nuclear or otherwise) concerned with formation evaluation. In addition, embodiments of the invention is applicable to measurements acquired in a plurality of azimuthal sectors. It does not matter whether these measurements are acquired by rotating the tool in an azimuthal direction or with a tool having multiple detectors such that no rotation of the tool is necessary. Furthermore, the invention is applicable to measurements acquired in a plurality of azimuthal sectors, whether these measurements were acquired in a single depth level or a plurality of depth levels. Accordingly, the scope of the invention should be limited only by the attached claims.

What is claimed is:

1. A method for tool path identification in formation evaluation, comprising:
    calculating a quality factor from measurements of at least one formation property acquired in each of a plurality of azimuthal sectors;
    identifying a centroid of the quality factors; and
    associating the centroid of the quality factors with a tool path.

2. The method of claim 1, wherein the measurements of the at least one formation property comprise gamma-gamma density measurements.

3. The method of claim 2, wherein the gamma-gamma density measurements comprise at least one selected from bulk density, compensated bulk density, correction factor, and photoelectric absorption cross section.

4. The method of claim 2, wherein the calculating the quality factor comprises parameterizing the measurements according to at least one factor selected from a spine factor, a rib factor, and a volumetric photoelectric factor.

5. The method of claim 1, wherein the identifying the centroid is performed with a Fourier expansion function.

6. The method of claim 1, wherein the measurements of the at least one formation property are acquired by rotating a tool in an azimuthal direction.

7. The method of claim 1, further comprising outputting corrected measurements of the at least one formation property by averaging the acquired measurements of the at least one formation property in a selected number of azimuthal sectors adjacent the tool path.

8. The method of claim 7, wherein the selected number is between two and five.

9. A method for tool path identification in formation evaluation, comprising:
   calculating a quality factor from measurements of at least one formation property acquired in each of a plurality of azimuthal sectors at a plurality of depth levels along an axis of a borehole;
   identifying a centroid of the quality factors at each of the plurality of depth levels; and
   associating the centroid of the quality factors at each of the plurality of depth level along the axis of the borehole to form a tool path.

10. The method of claim 9, wherein the measurements of the at least one formation property comprise gamma-gamma density measurements.

11. The method of claim 10, wherein the gamma-gamma density measurements comprise at least one selected from bulk density, compensated bulk density, correction factor, and photoelectric absorption cross section.

12. The method of claim 10, wherein the calculating the quality factor comprises parameterizing the measurements according to at least one factor selected from a spine factor, a rib factor, and a volumetric photoelectric factor.

13. The method of claim 9, wherein the identifying the centroid is performed with a Fourier expansion function.

14. The method of claim 9, wherein the measurements of the at least one formation property arc acquired by rotating a tool in an azimuthal direction.

15. The method of claim 9, further comprising outputting corrected measurements of the at least one formation property by averaging the acquired measurements of the at least one formation property in a selected number of the azimuthal sectors adjacent the tool path.

16. The method of claim 15, wherein the selected number is between two and five.

17. The method of claim 9, wherein the measurements of the at least one formation property are averaged over a selected number of depth levels at a corresponding azimuthal orientation before the calculating the quality factor.

18. The method of claim 17, wherein the selected number is between two and five.

19. The method of claim 9, wherein the quality factors are averaged over a selected number of depth levels at a corresponding azimuthal orientation before the identifying the centroid.

20. The method of claim 19, wherein the selected number is between two and five.

21. A method for determining corrected measurements of at least one formation property, comprising:
   identifying a tool path from measurements of the at least one formation property acquired in a plurality of azimuthal sectors at each of a plurality of depth levels along a borehole; and
   computing the corrected measurements of the at least one formation property at each of the plurality of depth levels by averaging the acquired measurements of the at least one formation property in a selected number of azimuthal sectors adjacent the tool path.

22. The method of claim 21, wherein the measurements of the at least one formation property are acquired by rotating a tool in an azimuthal direction.

23. The method of claim 21, wherein the averaging comprises a weighted averaging.

24. The method of claim 21, wherein the selected number is between two and five.

25. The method of claim 21, wherein the identifying the tool path comprises:
   calculating a quality factor from the measurements of the at least one formation property in each of the plurality of azimuthal sectors;
   identifying a centroid of the quality factors at each of the plurality of depth levels; and
   associating the centroid of the quality factors at each of the plurality of depth levels along a borehole to form the tool path.

26. Time method of claim 25, wherein the identifying the centroid is performed with a Fourier expansion function.

27. The method of claim 21, wherein the measurements of the at least one formation property comprise gamma-gamma density measurements.

28. The method of claim 27, wherein the gamma-gamma density measurements comprise at least one selected from bulk density, compensated bulk density, correction factor, and photoelectric absorption cross section.

29. The method of claim 27, wherein the calculating the quality factor comprises parameterizing the measurements according to at least one factor selected from a spine factor, a rib factor, and a volumetric photoelectric factor.

30. A method of well logging, comprising:
   acquiring measurements of at least one formation property in a plurality of azimuthal sectors;
   determining a tool path from the measurements in the plurality of azimuthal sectors; and
   computing corrected measurements of the at least one formation property by averaging the acquired measurements in a selected number of azimuthal sectors adjacent the tool path.

31. The method of claim 30, wherein the acquiring the measurements of the at least one formation property was performed by rotating a tool in an azimuthal direction.

32. The method of claim 30, wherein the selected number is between two and five.

33. The method of claim 30, wherein the determining the tool path comprises:
   calculating a quality factor from the measurements of the at least one formation property in each of the plurality of azimuthal sectors; identifying a centroid of the quality factors; and associating the centroid of the quality factors with the tool path.

34. The method of claim 33, wherein the measurements of the formation properties comprise gamma-gamma density measurements.

35. The method of claim 34, wherein the gamma-gamma density measurements comprise at least one selected from bulk density, compensated bulk density, correction factor, and photoelectric absorption cross section.

36. The method of claim 34, wherein the calculating the quality factor comprises parameterizing the measurements according to at least one factor selected from a spine factor, a rib factor, and a volumetric photoelectric factor.

37. The method of claim 33, wherein the identifying the centroid is performed with a Fourier expansion function.

38. A method of well logging, comprising:
   moving a well logging tool along an axis of a borehole;
   acquiring measurements of at least one formation property in a plurality of azimuthal sectors at a plurality of depth levels;
   determining a tool path from the measurements in the plurality of azimuthal sectors; and computing corrected measurements of the at least one formation property by averaging the acquired measurements of the at least one formation property in a selected number of azimuthal sectors adjacent the tool path.

39. The method of claim 38, wherein the selected number is between two and five.

40. The method of claim 38, wherein the determining the tool path comprises:

calculating a quality factor from the measurements in each of the plurality of azimuthal sectors;

identifying a centroid of the quality factors at each of the plurality of depth levels; and associating the centroid of the quality factors at each of the plurality of depth levels along the axis of the borehole to form the tool path.

41. The method of claim 40, wherein the measurements of the at least one formation property comprise gamma-gamma density measurements.

42. The method of claim 41, wherein the gamma-gamma density measurements comprise at least one selected from bulk density, compensated bulk density, correction, and photoelectric absorption cross section.

43. The method of claim 41, wherein the calculating the quality factor comprises parameterizing the measurements according to at least one factor selected from a spine factor, a rib factor, and a volumetric photoelectric factor.

44. The method of claim 40, wherein the identifying the centroid is performed with a Fourier expansion function.

45. The method of claim 38, further comprising rotating the well logging tool in the borehole.

46. A system for well logging, comprising:

a well logging tool having at least one detector for acquiring measurements of at least one formation property in a plurality of azimuthal sectors; and a processor adapted to calculate a quality factor from the measurements of the at least one formation property in each of the plurality of azimuthal sectors, the processor being also adapted to determine a centroid of the quality factors, and the processor being also adapted to identity a tool path from the centroid of the quality factors.

47. The system of claim 46, wherein the processor is further adapted to compute corrected measurements by averaging the acquired measurements in a selected number of the azimuthal sectors adjacent the tool path.

* * * * *

UNITED STATES PATENT AND TRADEMARK OFFICE
CERTIFICATE OF CORRECTION

| | |
|---|---|
| PATENT NO. | : 6,696,684 B2 |
| APPLICATION NO. | : 10/034476 |
| DATED | : November 29, 2005 |
| INVENTOR(S) | : Gilboa et al. |

It is certified that error appears in the above-identified patent and that said Letters Patent is hereby corrected as shown below:

In the Claims:

Col. 15
line 51, delete "tipper" and substitute therefor --upper--.
line 56, delete "tipper" and substitue therefor --upper--.

Signed and Sealed this

Nineteenth Day of September, 2006

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 6,696,684 B2 |
| APPLICATION NO. | : 10/034476 |
| DATED | : February 24, 2004 |
| INVENTOR(S) | : Richard J. Radtke et al. |

It is certified that error appears in the above-identified patent and that said Letters Patent is hereby corrected as shown below:

This certificate supersedes Certificate of Correction issued September 19, 2006, should be vacated since no Certificate of Correction was granted for this patent number.

Signed and Sealed this

Fourteenth Day of November, 2006

JON W. DUDAS
*Director of the United States Patent and Trademark Office*